US012729843B2

(12) United States Patent
Wang

(10) Patent No.: US 12,729,843 B2
(45) Date of Patent: Sep. 8, 2026

(54) RETRACTABLE SUPPORT AND LIGHTING FIXTURE

(71) Applicant: Shenzhen Guangsu Electronic Technology Co., Ltd., Shenzhen (CN)

(72) Inventor: Jinguang Wang, Shenzhen (CN)

(73) Assignee: Shenzhen Guangsu Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/412,752

(22) Filed: Dec. 8, 2025

(65) Prior Publication Data

US 2026/0185686 A1 Jul. 2, 2026

(30) Foreign Application Priority Data

Jan. 2, 2025 (CN) ......................... 202520003952.2

(51) Int. Cl.

*F21V 21/28* (2006.01)
*F21V 21/06* (2006.01)
*F21V 21/22* (2006.01)
*F21V 21/30* (2006.01)
*F21W 131/10* (2006.01)

(52) U.S. Cl.

CPC .............. *F21V 21/28* (2013.01); *F21V 21/06* (2013.01); *F21V 21/22* (2013.01); *F21V 21/30* (2013.01); *F21W 2131/10* (2013.01)

(58) Field of Classification Search

CPC .............. F21V 21/06; F21V 21/22–35; F21W 2131/10

See application file for complete search history.

(56) References Cited

U.S. PATENT DOCUMENTS

| | | | | |
|---|---|---|---|---|
| 2,466,722 | A * | 4/1949 | May ........................ | F21V 21/26 248/278.1 |
| 9,587,792 | B1 * | 3/2017 | Parsons .................... | H05K 7/16 |
| 10,082,281 | B1 * | 9/2018 | Liao ........................ | F21S 6/005 |
| 2015/0144372 | A1 | 5/2015 | Grant et al. | |
| 2021/0071862 | A1 | 3/2021 | Karmous | |
| 2023/0392774 | A1 * | 12/2023 | Wiegel ................ | F21V 33/0096 |

FOREIGN PATENT DOCUMENTS

| | | |
|---|---|---|
| CN | 223564147 U | 11/2025 |

* cited by examiner

*Primary Examiner* — Jason M Han

(57) ABSTRACT

A retractable support and a lighting fixture. The retractable support includes a main rod body, a support assembly, and a functional assembly. The functional assembly includes a first rotatable seat, a second rotatable seat, a third rotatable seat, and a functional module; the first rotatable seat is connected to the main rod body, the second rotatable seat is rotatably disposed on the first rotatable seat about a first rotation axis, the third rotatable seat is rotatably disposed on the second rotatable seat about a second rotation axis, and the functional module is disposed on the third rotatable seat; the functional module is rod-shaped. An axial direction of the first rotation axis is perpendicular to an axial direction of the main rod body, and an axial direction of the second rotation axis is perpendicular to the axial direction of the first rotation axis.

16 Claims, 2 Drawing Sheets

RETRACTABLE SUPPORT AND LIGHTING FIXTURE

CROSS REFERENCE

The present application claims priority of Chinese Patent Application No. 202520003952.2, filed on Jan. 2, 2025, the entire contents of which are hereby incorporated by reference in its entirety.

TECHNICAL FIELD

The present disclosure relates to the field of lighting fixture technologies, and in particular, to a retractable support and a lighting fixture.

BACKGROUND

The primary function of lighting fixtures is to provide illumination. Depending on their usage scenarios, they may be mainly categorized as indoor lighting fixtures and outdoor lighting fixtures. Indoor lighting fixtures are generally installed in a fixed manner, whereas outdoor lighting fixtures, due to their uncertain places of use, require consideration of more factors during application.

Currently, some outdoor lighting fixtures capable of providing a large illumination range are often bulky and heavy, while smaller products often struggle to provide a large illumination range.

SUMMARY OF THE DISCLOSURE

The purpose of the present disclosure is to provide a retractable support and a lighting fixture to solve at least one of the technical problems mentioned above.

To solve the technical problems, the present disclosure provides a retractable support and a lighting fixture. In a first aspect, the present disclosure provides a retractable support, including a main rod body, a support assembly, and a functional assembly;

- wherein the support assembly is disposed on a first end of the main rod body, the functional assembly is retractably disposed on a second end of the main rod body, and the main rod body internally defines an accommodation cavity suitable for accommodating the functional assembly;
- wherein the functional assembly includes a first rotatable seat, at least one second rotatable seat, at least one third rotatable seat, and at least one functional module; the first rotatable seat is connected to the main rod body; the at least one second rotatable seat and the at least one third rotatable seat are arranged in a one-to-one correspondence; for each of the at least one second rotatable seat, the second rotatable seat is rotatably disposed on the first rotatable seat about a first rotation axis, and a corresponding one of the at least one third rotatable seat is rotatably disposed on the second rotatable seat about a second rotation axis; each of the at least one functional module is disposed on a corresponding one of the at least one third rotatable seat; each of the at least one functional module is rod-shaped;
- an axial direction of the first rotation axis is perpendicular to an axial direction of the main rod body, and an axial direction of the second rotation axis is perpendicular to the axial direction of the first rotation axis.

In the above solution, in a retracted state, the functional assembly is retracted into the main rod body, i.e., the whole product presents a rod shape. When the functional assembly is a main body of a lighting fixture, the entire mechanism can be understood as a retractable lighting fixture, which presents a rod shape in the retracted state, thereby facilitating portability for users. In a usage state, the functional assembly can be pulled out. The pulled-out functional assembly allows for flexible adjustment in multiple ways. Specifically, the functional module can achieve a first level of rotation with the cooperation of the third rotatable seat, the third rotatable seat can achieve a second level of rotation on the second rotatable seat, and the second rotatable seat can achieve a third level of rotation based on the first rotatable seat. With the cooperation of the above mechanisms, the functional module achieves flexible positional adjustment. When multiple functional modules are arranged, an expanded state can be achieved. When the functional module is the main body of the lighting fixture, a larger illumination range can be achieved through the expanded main body, or a required illumination angle can be adjusted according to actual needs, which offers stronger usage flexibility.

In some embodiments, the main rod body includes a retractable rod, and a second end of the retractable rod is connected to the first rotatable seat.

In the above solution, the main rod body includes a retractable rod, meaning that users can adjust the extended length according to actual usage needs, while the main rod body can be retracted to reduce the occupied volume when not in use, thereby offering both portability for storage and usage flexibility.

In some embodiments, the at least one third rotatable seat is at least two second rotatable seats that are arranged side by side along the axial direction of the first rotation axis; the at least one third rotatable seat is at least two third rotatable seats that are arranged in a one-to-one correspondence with the at least two second rotatable seats, and the at least one functional module is a plurality of functional modules to be matched with the at least two third rotatable seats.

In some embodiments, each of the at least two third rotatable seats includes a rotating disc; a first rotatable column is formed on the rotating disc, and a first limiting hole that rotatably cooperates with the first rotatable column is defined on a corresponding one of the at least two second rotatable seats.

In the above solution, both the second rotatable seats and the third rotatable seats are provided with two in number, thus further allowing for the corresponding setup of multiple functional modules, thereby enabling more flexible positional adjustment of the functional modules during subsequent use.

In some embodiments, for each of the plurality of functional modules, the functional module is rotatably disposed on the rotating disc of a corresponding one of the at least two third rotatable seats about a third rotation axis, and the third rotation axis is parallel to an axial direction of the functional module.

In the above solution, the functional module can achieve self-rotation adjustment, thereby further enhancing its adjustable dimensions and improving adjustment flexibility.

In some embodiments, a second rotatable column is arranged on an end of the functional module close to the corresponding one of the at least two third rotatable seats, and the second rotatable column passes through the rotating disc of the corresponding one of the at least two third rotatable seats.

In some embodiments, for each of the at least two third rotatable seats, in a case where the rotating disc of the third rotatable seat rotates on a corresponding one of the at least two second rotatable seats, the second rotatable column of a corresponding one of the plurality of functional modules abuts against a peripheral wall of the corresponding one of the at least two second rotatable seats.

In the above solution, the second rotatable column can cooperate with the second rotatable seat. The first rotatable column is located on an axis of a rotation shaft, while the second rotatable column cooperates to achieve limiting, thereby enhancing the stability of the rotation of the rotating disc on the second rotatable seat.

In some embodiments, for each of the at least two third rotatable seats, the rotating disc of the third rotatable seat is matched with corresponding at least one of the plurality of functional modules.

In some embodiments, the support assembly includes a foldable tripod.

In the above solution, the support assembly includes a foldable tripod, which can be pulled put for support during use and folded up when retracted. After being folded, the foldable tripod is coaxial with the main rod body, presenting a long rod shape overall, which is easy to carry.

In a second aspect, the present disclosure provides a lighting fixture, including the retractable support as above; wherein the functional module includes a main body of the lighting fixture.

In the above solution, the lighting fixture can be retracted into a long rod-shaped structure when not in use, occupying a small space. During use, with the cooperation of the first rotatable seat, the second rotatable seat, and the third rotatable seat, the main body of the lighting fixture can achieve flexible expansion, thereby compensating for the insufficient illumination range of small lighting fixtures, while also allowing flexible adjustment of the illumination position.

Compared with the related art, the beneficial effects of the present disclosure are as follows: The functional module can achieve a first level of rotation with the cooperation of the third rotatable seat, the third rotatable seat can achieve a second level of rotation on the second rotatable seat, and the second rotatable seat can achieve a third level of rotation based on the first rotatable seat. With the cooperation of the above mechanisms, the functional module achieves flexible positional adjustment. When multiple functional modules are arranged, an expanded state can be achieved. When the functional module is the main body of the lighting fixture, a larger illumination range can be achieved through the expanded main body, or a required illumination angle can be adjusted according to actual needs, which offers stronger usage flexibility.

BRIEF DESCRIPTION OF THE DRAWINGS

In order to more clearly illustrate the technical solutions in the embodiments of the present disclosure or the related art, the following will briefly introduce the drawings needed for describing the embodiments or the related art. Obviously, the drawings in the following description are only some embodiments of the present disclosure. For those skilled in the art, other drawings may be obtained based on these drawings without creative effort.

REFERENCE NUMERALS

Figure 1:
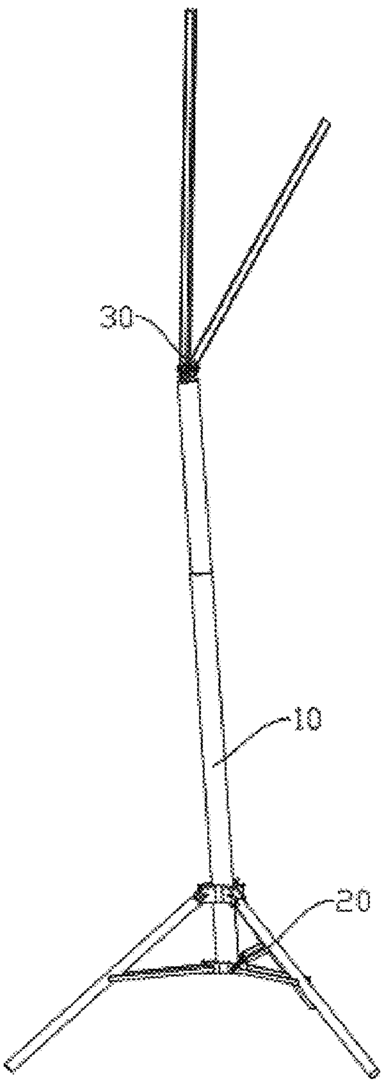
FIG. 1 is a schematic diagram of an overall structure according to some embodiments of the present disclosure.

10, main rod body; 20, support assembly; 30, functional assembly; 31, first rotatable seat; 32, second rotatable seat; 321, first limiting hole; 33, third rotatable seat; 331, first rotatable column; 34, functional module; 341, second rotatable column.

DETAILED DESCRIPTION

The following will disclose multiple implementation modes of the present disclosure through diagrams. For clarity, many practical details will be described together in the following narration. However, it should be understood that these practical details should not be intended to limit the present disclosure. That is to say, in some implementation modes of the present disclosure, these practical details are unnecessary. Furthermore, to simplify the drawings, some conventionally used structures and components will be shown in a simplified schematic manner in the drawings.

It needs to be stated that all directional indications in the embodiments of the present disclosure, such as up, down, left, right, front, back . . . , are only intended to explain relative positional relationships, movement situations, etc., between various components under a specific posture as shown in the drawings. When this specific posture changes, this directional indication will change accordingly.

Furthermore, in the present disclosure, terms such as "first" and "second" are used for descriptive purposes only and are not intended to indicate any order or sequence, nor are they intended to limit the present disclosure. They are merely intended to distinguish components or operations described by the same technical term and cannot be understood as indicating or implying relative importance or implicitly specifying the quantity of the indicated technical features. Thus, features defined with "first" and "second" may explicitly or implicitly include at least one of these features. Furthermore, the technical solutions between various embodiments may be combined, but it must be based on the premise that those skilled in the art can realize it. When the combination of technical solutions appears contradictory or impossible to realize, it should be considered that such a combination of technical solutions does not exist and is not within the scope of protection claimed by the present disclosure.

In order to further understand the content, characteristics, and efficacy of the present disclosure, the following embodiments are provided and described in detail with the accompanying drawings.

The primary function of lighting fixtures is to provide illumination. Depending on their usage scenarios, they may be mainly categorized as indoor lighting fixtures and outdoor lighting fixtures. Indoor lighting fixtures are generally installed in a fixed manner, whereas outdoor lighting fixtures, due to their uncertain places of use, require consideration of more factors during application. Currently, some outdoor lighting fixtures capable of providing a large illumination range are often bulky and heavy, while smaller products often struggle to provide a large illumination range.

To solve the above technical problems, the present disclosure provides the following technical solution.

Specifically, referring to FIGS. 1-4, a retractable support is provided, including a main rod body 10, a support assembly 20, and a functional assembly 30.

The support assembly 20 is disposed on a first end of the main rod body 10, the functional assembly 30 is retractably disposed on a second end of the main rod body 10, and the main rod body 10 internally defines an accommodation cavity suitable for accommodating the functional assembly 30.

It can be understood that the first end and the second end are two opposite ends of the main rod body 10.

Figure 2:
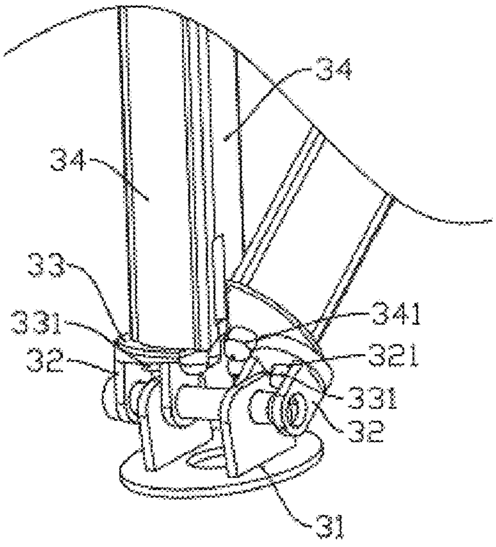
FIG. 2 is a partial structural schematic diagram of a functional assembly according to some embodiments of the present disclosure.
Figure 3:
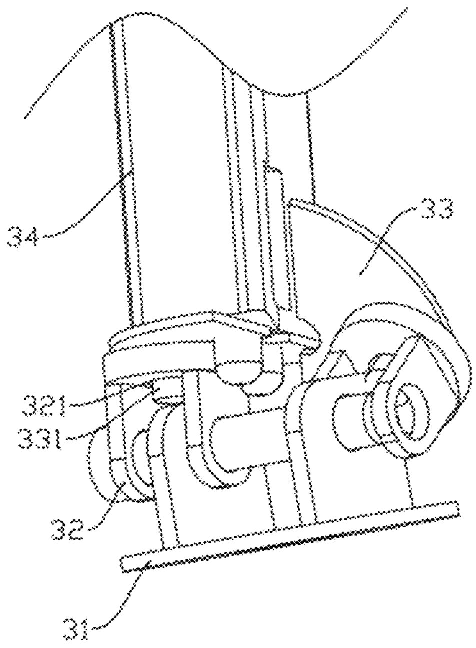
FIG. 3 is a partial structural schematic diagram of a functional assembly according to some embodiments of the present disclosure.
Figure 4:
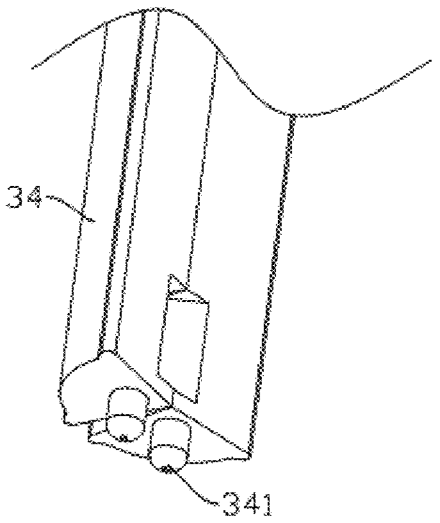
FIG. 4 is a partial structural schematic diagram of a functional module according to some embodiments of the present disclosure.

Referring to FIGS. 2-3, the functional assembly 30 includes a first rotatable seat 31, a second rotatable seat 32, a third rotatable seat 33, and a functional module 34; the first rotatable seat 31 is connected to the main rod body 10, the second rotatable seat 32 is rotatably disposed on the first rotatable seat 31 about a first rotation axis, the third rotatable seat 33 is rotatably disposed on the second rotatable seat 32 about a second rotation axis, and the functional module 34 is disposed on the third rotatable seat 33; the functional module 34 is rod-shaped.

An axial direction of the first rotation axis is perpendicular to an axial direction of the main rod body 10, and an axial direction of the second rotation axis is perpendicular to the axial direction of the first rotation axis.

In the above solution, in a retracted state, the functional assembly 30 is retracted into the main rod body 10, i.e., the whole product presents a rod shape. When the functional assembly 30 is a main body of a lighting fixture, the entire mechanism can be understood as a retractable lighting fixture, which presents a rod shape in the retracted state, thereby facilitating portability for users. In a usage state, the functional assembly 30 can be pulled out. The pulled-out functional assembly 30 allows for flexible adjustment in multiple ways. Specifically, the functional module 34 can achieve a first level of rotation with the cooperation of the third rotatable seat 33, the third rotatable seat 33 can achieve a second level of rotation on the second rotatable seat 32, and the second rotatable seat 32 can achieve a third level of rotation based on the first rotatable seat 31. With the cooperation of the above mechanisms, the functional module 34 achieves flexible positional adjustment. When multiple functional modules 34 are arranged, an expanded state can be achieved. When the functional module 34 is the main body of the lighting fixture, a larger illumination range can be achieved through the expanded main body, or a required illumination angle can be adjusted according to actual needs, which offers stronger usage flexibility.

Specifically, in some embodiments, the functional module 34 includes a mounting bracket. It can be understood that corresponding mounting holes may be defined on the mounting bracket. After the mounting bracket is expanded, users can assemble other mechanisms through the mounting holes.

In other embodiments, the functional module 34 may include a main body of the lighting fixture; further, the main body of the lighting fixture may be an LED lamp.

Specifically, referring to FIG. 1, the main rod body 10 includes a retractable rod, and a second end of the retractable rod is connected to the first rotatable seat 31.

In the above solution, the main rod body 10 includes a retractable rod, meaning that users can adjust the extended length according to actual usage needs, while the main rod body 10 can be retracted to reduce the occupied volume when not in use, thereby offering both portability for storage and usage flexibility.

Specifically, referring to FIGS. 2-3, at least two second rotatable seats 32 are provided and arranged side by side along the axial direction of the first rotation axis; each second rotatable seat 32 is rotatably arranged with a corresponding third rotatable seat 33.

In some embodiments, two second rotatable seats are provided.

Further, the third rotatable seat 33 includes a semicircular rotating disc; a first rotatable column 331 is formed on the rotating disc, and a first limiting hole 321 that rotatably cooperates with the first rotatable column 331 is defined on the second rotatable seat 32.

Specifically, when the functional assembly 30 is retracted into the accommodation cavity, the two rotating discs define a virtual circle.

It can be understood that in other embodiments, the rotating disc may be other shapes, defining a square, circle, etc., after combination, which is not limited herein.

In the above solution, both the second rotatable seats 32 and the third rotatable seats 33 are provided with two in number, thus further allowing for the corresponding setup of multiple functional modules 34, thereby enabling more flexible positional adjustment of the functional modules 34 during subsequent use.

Specifically, the functional module 34 is rotatably disposed on the rotating disc about a third rotation axis, and the third rotation axis is parallel to an axial direction of the functional module 34.

In the above solution, the functional module 34 can achieve self-rotation adjustment, thereby further enhancing its adjustable dimensions and improving adjustment flexibility.

Specifically, a second rotatable column 341 is arranged on an end of the functional module 34 close to the third rotatable seat 33, and the second rotatable column 341 passes through the rotating disc.

Further, when the rotating disc rotates about the second rotation axis on the second rotatable seat 32, the second rotatable column 341 abuts against a peripheral wall of the second rotatable seat 32.

In the above solution, the second rotatable column 341 can cooperate with the second rotatable seat 32. The first rotatable column is located on an axis of a rotation shaft, while the second rotatable column 341 cooperates to achieve limiting, thereby enhancing the stability of the rotation of the rotating disc on the second rotatable seat 32.

In other embodiments, a first rotatable column is formed on the second rotatable seat, and a first limiting hole is defined on the rotating disc.

Specifically, at least one functional module 34 is provided on each rotating disc.

Specifically, referring to FIG. 1, the support assembly 20 includes a foldable tripod.

In the above solution, the support assembly 20 includes a foldable tripod, which can be pulled put for support during use and folded up when retracted. After being folded, the foldable tripod is coaxial with the main rod body 10, presenting a long rod shape overall, which is easy to carry.

The present disclosure further provides a lighting fixture, which includes the retractable support as described above.

The functional module 34 includes a main body of the lighting fixture.

In the above solution, the lighting fixture can be retracted into a long rod-shaped structure when not in use, occupying a small space. During use, with the cooperation of the first rotatable seat 31, the second rotatable seat 32, and the third rotatable seat 33, the main body of the lighting fixture can achieve flexible expansion, thereby compensating for the insufficient illumination range of small lighting fixtures, while also allowing flexible adjustment of the illumination position.

The above descriptions are only some embodiments of the present disclosure and are not intended to limit the present disclosure in any form. Any simple modifications, equivalent variations, and amendments made to the above embodiments based on the essence of the technology of the present disclosure shall fall within the scope of the technical solution of the present disclosure.

What is claimed is:

1. A retractable support, comprising a main rod body, a support assembly, and a functional assembly;

wherein the support assembly is disposed on a first end of the main rod body, the functional assembly is retractably disposed on a second end of the main rod body, and the main rod body internally defines an accommodation cavity suitable for accommodating the functional assembly;

wherein the functional assembly comprises a first rotatable seat, at least one second rotatable seat, at least one third rotatable seat, and at least one functional module; the first rotatable seat is connected to the main rod body; the at least one second rotatable seat and the at least one third rotatable seat are arranged in a one-to-one correspondence; for each of the at least one second rotatable seat, the second rotatable seat is rotatably disposed on the first rotatable seat about a first rotation axis, and a corresponding one of the at least one third rotatable seat is rotatably disposed on the second rotatable seat about a second rotation axis; each of the at least one functional module is disposed on a corresponding one of the at least one third rotatable seat; each of the at least one functional module is rod-shaped;

an axial direction of the first rotation axis is perpendicular to an axial direction of the main rod body, and an axial direction of the second rotation axis is perpendicular to the axial direction of the first rotation axis;

wherein the at least one second rotatable seat is at least two second rotatable seats that are arranged side by side along the axial direction of the first rotation axis; the at least one third rotatable seat is at least two third rotatable seats that are arranged in a one-to-one correspondence with the at least two second rotatable seats, and the at least one functional module is a plurality of functional modules to be matched with the at least two third rotatable seats.

2. The retractable support according to claim 1, wherein the main rod body comprises a retractable rod, and a second end of the retractable rod is connected to the first rotatable seat.

3. The retractable support according to claim 1, wherein each of the at least two third rotatable seats comprises a rotating disc; a first rotatable column is formed on the rotating disc, and a first limiting hole that rotatably cooperates with the first rotatable column is defined on a corresponding one of the at least two second rotatable seats.

4. The retractable support according to claim 3, wherein for each of the plurality of functional modules, the functional module is rotatably disposed on the rotating disc of a corresponding one of the at least two third rotatable seats about a third rotation axis, and the third rotation axis is parallel to an axial direction of the functional module.

5. The retractable support according to claim 4, wherein a second rotatable column is arranged on an end of the functional module close to the corresponding one of the at least two third rotatable seats, and the second rotatable column passes through the rotating disc of the corresponding one of the at least two third rotatable seats.

6. The retractable support according to claim 5, wherein for each of the at least two third rotatable seats, in a case where the rotating disc of the third rotatable seat rotates on a corresponding one of the at least two second rotatable seats, the second rotatable column of a corresponding one of the plurality of functional modules abuts against a peripheral wall of the corresponding one of the at least two second rotatable seats.

7. The retractable support according to claim 6, wherein for each of the at least two third rotatable seats, the rotating disc of the third rotatable seat is matched with corresponding at least one of the plurality of functional modules.

8. The retractable support according to claim 1, wherein the support assembly comprises a foldable tripod.

9. A lighting fixture, comprising a retractable support;

wherein the retractable support comprises a main rod body, a support assembly, and a functional assembly;

wherein the support assembly is disposed on a first end of the main rod body, the functional assembly is retractably disposed on a second end of the main rod body, and the main rod body internally defines an accommodation cavity suitable for accommodating the functional assembly;

wherein the functional assembly comprises a first rotatable seat, at least one second rotatable seat, at least one third rotatable seat, and at least one functional module; the first rotatable seat is connected to the main rod body; the at least one second rotatable seat and the at least one third rotatable seat are arranged in a one-to-one correspondence; for each of the at least one second rotatable seat, the second rotatable seat is rotatably disposed on the first rotatable seat about a first rotation axis, and a corresponding one of the at least one third rotatable seat is rotatably disposed on the second rotatable seat about a second rotation axis; each of the at least one functional module is disposed on a corresponding one of the at least one third rotatable seat; each of the at least one functional module is rod-shaped;

an axial direction of the first rotation axis is perpendicular to an axial direction of the main rod body, and an axial direction of the second rotation axis is perpendicular to the axial direction of the first rotation axis;

wherein the at least one second rotatable seat is at least two second rotatable seats that are arranged side by side along the axial direction of the first rotation axis; the at least one third rotatable seat is at least two third rotatable seats that are arranged in a one-to-one correspondence with the at least two second rotatable seats, and the at least one functional module is a plurality of functional modules to be matched with the at least two third rotatable seats;

wherein the functional module comprises a main body of the lighting fixture.

10. The lighting fixture according to claim 9, wherein the main rod body comprises a retractable rod, and a second end of the retractable rod is connected to the first rotatable seat.

11. The lighting fixture according to claim 9, wherein each of the at least two third rotatable seats comprises a rotating disc; a first rotatable column is formed on the rotating disc, and a first limiting hole that rotatably cooperates with the first rotatable column is defined on a corresponding one of the at least two second rotatable seats.

12. The lighting fixture according to claim 11, wherein for each of the plurality of functional modules, the functional module is rotatably disposed on the rotating disc of a corresponding one of the at least two third rotatable seats about a third rotation axis, and the third rotation axis is parallel to an axial direction of the functional module.

13. The lighting fixture according to claim 12, wherein a second rotatable column is arranged on an end of the functional module close to the corresponding one of the at least two third rotatable seats, and the second rotatable column passes through the rotating disc of the corresponding one of the at least two third rotatable seats.

14. The lighting fixture according to claim 13, wherein for each of the at least two third rotatable seats, in a case where the rotating disc of the third rotatable seat rotates on a corresponding one of the at least two second rotatable seats, the second rotatable column of a corresponding one of the plurality of functional modules abuts against a peripheral wall of the corresponding one of the at least two second rotatable seats.

15. The lighting fixture according to claim 14, wherein for each of the at least two third rotatable seats, the rotating disc of the third rotatable seat is matched with corresponding at least one of the plurality of functional modules.

16. The lighting fixture according to claim 9, wherein the support assembly comprises a foldable tripod.

* * * * *